United States Patent [19]

Lovendahl

[11] Patent Number: 4,591,302

[45] Date of Patent: May 27, 1986

[54] COUNTERSINK WITH DISPOSABLE INSERT

[76] Inventor: Norman H. Lovendahl, NL Tool Co., 39 Legion St., Maywood, Ill. 60153-2395

[21] Appl. No.: 643,163

[22] Filed: Aug. 22, 1984

[51] Int. Cl.[4] .............................................. B23B 51/10
[52] U.S. Cl. .................................. 408/188; 408/200; 408/713; 407/104
[58] Field of Search ............... 408/188, 186, 713, 189, 408/200, 201, 224; 76/108 R; 145/116 R; 407/104

[56] References Cited

U.S. PATENT DOCUMENTS

| | | | |
|---|---|---|---|
| 2,437,364 | 3/1948 | Smith | 408/189 |
| 3,540,323 | 11/1970 | Rishel | 408/186 |
| 3,747,179 | 7/1973 | Lovendahl | 407/104 |
| 3,785,746 | 1/1974 | Wolf | 408/188 |
| 3,963,365 | 6/1976 | Shallenberger | 408/713 |
| 4,197,042 | 4/1980 | Krhounek | 408/713 |
| 4,210,406 | 7/1980 | Berry | 408/713 |
| 4,340,327 | 7/1982 | Martins | 408/188 |

Primary Examiner—Jimmy C. Peters

[57] ABSTRACT

A countersink utilizes standard, inexpensive inserts for cutting. Thus the tool never needs sharpening. The inserts may be mounted at several locations on the tool, providing a versatile tool that can handle a wide range of hole sizes.

4 Claims, 5 Drawing Figures

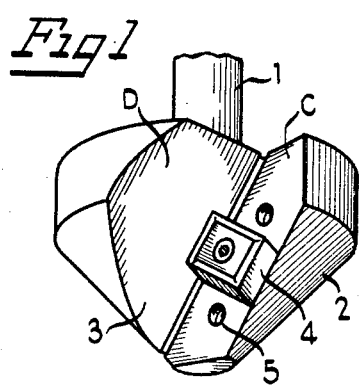
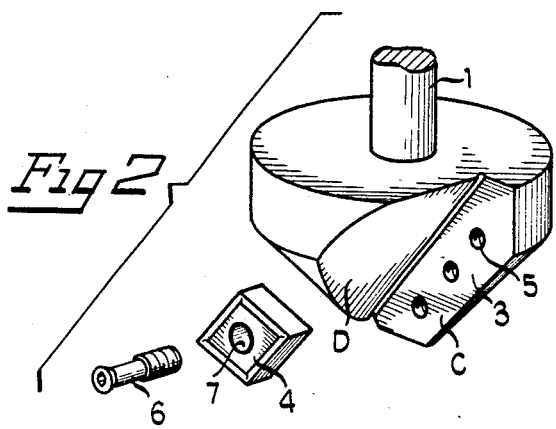
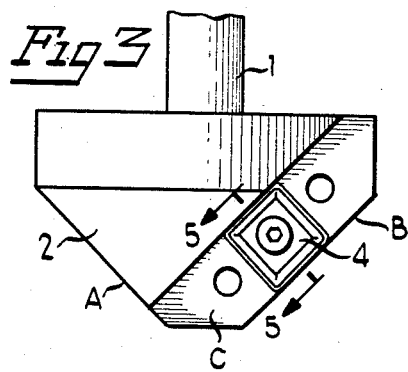
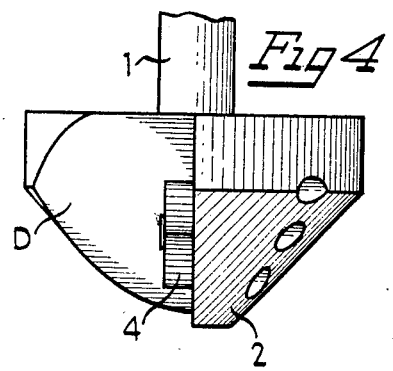
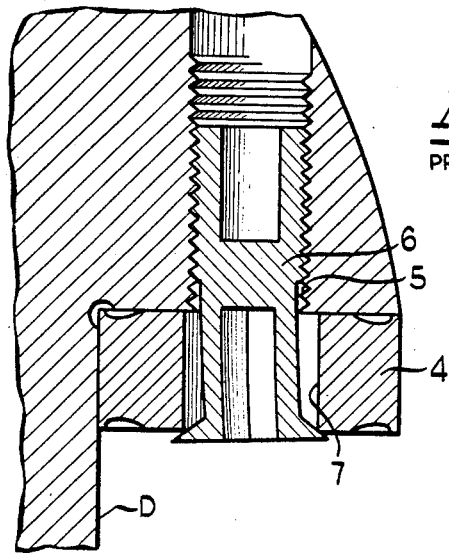

COUNTERSINK WITH DISPOSABLE INSERT

BACKGROUND OF THE INVENTION

This invention relates to countersinks.

Countersinks are most commonly made in one piece of high speed steel or solid carbide. The disdvantage of this type of tool is that grinding is required to resharpen the tool when it dulls. The tool is eventually consumed completely by grinding.

Another type of countersink utilizes carbide inserts, but these inserts are of a special nature unique to the tool, and consequently quite expensive. Because of the expense of these special inserts, they require sharpening as a matter of practicality as they dull.

A third type of countersink utilizes standard inexpensive indexable carbide inserts, but only in one position on the tool. Consequently this type of tool cannot handle a wide range of hole sizes.

SUMMARY OF THE INVENTION

The countersink which is the subject of this application utilizes standard indexable inserts. Sharpening of the tool is not required as the inserts are so inexpensive they can be disposed of when dull. The inserts may be mounted in several locations on the tool to handle a wide range of hole sizes.

The inserts are mounted in a groove formed in a conical tool body. The tool is conventionally attached to a rotating machine tool such as a drill press or milling machine by suitable means.

BRIEF DESCRIPTION OF THE DRAWINGS

FIG. 1 is a perspective view of the invention.

FIG. 2 shows the invention in exploded perspective.

FIGS. 3 and 4 are side views of the countersink, from different angles.

FIG. 5 is a cross-section of the countersink taken along line 5—5 of FIG. 4.

DESCRIPTION OF THE PREFERRED EMBODIMENTS

Referring to FIGS. 1,2,3, and 4, the countersink includes a shank 1 is inserted into a chuck and a conical cutter body 2. The conical body 2 may be made to various tapers to cut differing chamfer angles. A 90° angle between the sides A and B (FIG. 3) would be typical, providing a 45° chamfer angle.

During the countersinking of a hole, the tool is fed into the workpiece to where the conical portion of the tool rotatably seats against the hole, for support and centering of the tool. Thus the conical body is in contact with the workpiece during the machining operation. It is therefore desirable that the tool be hardened for wear resistance. The preferred material of construction for the tool is tool steel, heat treated for hardness.

Formed into the side of the conical cutter body is a square-cornered insert-holding groove 3. This groove provides an insert mounting base C and a shoulder D.

Carbide insert 4 is fastened to the mounting base C. The present invention utilizes standard indexable inserts, such as those bearing the designations SNMG 432, SNMG 542, SNMA 432, or SMNA 542. These inserts have eight cutting edges and are cheap enough to throw away when dull. Not only carbide, but also high speed steel or ceramic inserts can be used with the tool.

The inserts can be mounted at a plurality of locations along the mounting base C to handle a wide range of hole sizes. Any suitable mounting system can be used. The insert mounting system pictured in FIGS. 2 and 5 is that used by NL Tool Co. of Maywood, IL. and is the subject of U.S. Pat. No. 3,747,179.

Taken from any suitable point along the axis of rotation of the tool, the radial distance to the cutting edge of the mounted insert is slightly greater than the radial distance to the conical surface of the cutter body. While the cutting edge of the insert is removing material from around the top of a hole, the conical surface of the cutter body is squeezed against the hole to center and stabilize the tool.

Insert mounting base C has in it several threaded holes 5 that are engaged by screw 6, which fastens insert 4 to the base. Holes 5 are very slightly closer to the shoulder D than insert mounting hole 7 so that the tapered head of screw 6 not only holds the insert against the mounting base, but also pushes the insert snugly against shoulder D. The screw is preferably hollow, it being desirable that it have some flexibility since the two holes it engages are slightly offset and the screw must bend slightly.

I claim:

1. A countersink which comprises:
a standard disposable indexable insert for cutting;
a conical cutter body,
said cutter body having formed in it a square-cornered insert-holding groove that is long enough to accomodate said insert at a plurality of locations with adequate support for machining, said insert-holding groove providing an insert mounting base on which is mounted said insert and a shoulder against which said insert rests, and
said cutter body being centered and stabilized during the machining operation by being fed into a hole to where its conical surface rotatably seats against the top of said hole; and
means for attaching said conical cutter body to a rotating machine tool.

2. The countersink of claim 1, wherein the mounting base has in it threaded holes at a plurality of locations that are slightly offset toward the shoulder of the insert-holding groove relative to the mounting hole in the standard insert, and wherein the insert is held in place by a flexible screw having a tapered head, said screw passing through the insert and engaging one of the threaded holes in the mounting base.

3. The countersink of claim 1, wherein the cutter body is constructed of tool steel, heat treated for wear resistance.

4. The countersink of claim 2, wherein the cutter body is constructed of tool steel, heat treated for wear resistance.

* * * * *